United States Patent [19]

Leonard

[11] 4,290,880

[45] Sep. 22, 1981

[54] SUPERCRITICAL PROCESS FOR PRODUCING DEASPHALTED DEMETALLIZED AND DERESINED OILS

[75] Inventor: Robert E. Leonard, Oklahoma City, Okla.

[73] Assignee: Kerr-McGee Refining Corporation, Oklahoma City, Okla.

[21] Appl. No.: 164,599

[22] Filed: Jun. 30, 1980

[51] Int. Cl.³ .............................................. C10G 21/00
[52] U.S. Cl. .................................................. 208/309
[58] Field of Search .................. 208/45, 309, 311, 319

[56] References Cited

U.S. PATENT DOCUMENTS

| | | | |
|---|---|---|---|
| 2,940,920 | 6/1960 | Garwin | 208/45 |
| 2,943,050 | 6/1960 | Beavon | 208/309 |
| 3,507,777 | 4/1970 | Hemminger | 208/309 |
| 3,658,695 | 4/1972 | Van Pool | 208/309 |
| 3,775,293 | 11/1973 | Watkins | 208/86 |
| 3,972,807 | 8/1976 | Uitti | 208/309 |
| 3,981,797 | 9/1976 | Kellar | 208/309 |
| 3,998,726 | 12/1976 | Bunas | 208/309 |
| 4,239,616 | 12/1980 | Gearhart | 208/309 |

Primary Examiner—Brian E. Hearn
Attorney, Agent, or Firm—William G. Addison

[57] ABSTRACT

A process for effecting a deep cut in a heavy hydrocarbon material without a decrease in the quality of the extracted oil caused by the presence of undesirable entrained resinous bodies and organometallic compounds. The heavy hydrocarbon material is contacted with a solvent in a first separation zone maintained at an elevated temperature and pressure to effect a separation of the feed into a first light phase and a first heavy phase comprising asphaltenes and some solvent. The first light phase is introduced into a second separation zone maintained at an elevated temperature and pressure to effect a separation of the first light phase into a second light phase comprising oils and solvent and a second heavy phase comprising resins and some solvent. A portion of the second heavy phase is withdrawn and introduced into an upper portion of the second separation zone to countercurrently contact the second light phase. The contacting removes at least a portion of any entrained resinous bodies and organometallic compounds from the oils contained in the second light phase.

14 Claims, 2 Drawing Figures

SUPERCRITICAL PROCESS FOR PRODUCING DEASPHALTED DEMETALLIZED AND DERESINED OILS

FIELD OF THE INVENTION

This invention relates to a process for producing at least three fractions, including a deep oil cut having a reduced metals content, from heavy hydrocarbon materials.

BRIEF DESCRIPTION OF THE PRIOR ART

Many methods of extracting various fractions from bituminous materials have been disclosed previously in the prior art, perhaps the most well known of these being termed "propane extraction" in which asphaltic materials are separated from heavy hydrocarbons to produce deasphalted oils by means of a single solvent extraction step using propane as the extractant.

In that it is desirable to obtain the greatest possible quantity of oils from a heavy hydrocarbon, such as a reduced crude, other extraction techniques have been developed. U.S. Pat. No. 2,940,920, assigned to the same assignee as the present invention, discloses a process capable of effecting a deeper cut in the heavy hydrocarbon materials than is available by means of propane extraction. That patent discloses effecting the separation by using high temperature-pressure techniques and by using pentane as one of a group of suitable solvents. Such practice permits a deeper cut to be made in the heavy hydrocarbon material, but as a consequence, more resinous bodies which include organometallic compounds are present in the resulting oil fraction, tending to decrease the quality of the oil.

Generally, organometallic compounds are substantially heavier than the oils and are associated with the asphaltenes in the heavy hydrocarbon materials. However, some of the organometallic compounds are associated with the resins and some of the heavier oils in the heavy hydrocarbon materials. The presence of organometallic compounds in the separated oils fraction is undesirable. The metals tend to poison catalysts employed in hydrotreating processes to upgrade the oils fraction into other useful products.

Various processes have been developed to improve the quantity of oils recovered from a heavy hydrocarbon material while reducing the quantity of organometallic compounds in the oils. U.S. Pat. No. 2,943,050 discloses a process for separating an oils fraction from a heavy hydrocarbon by employing conventional solvent deasphalting techniques and then contacting a deasphalting solvent-oil mixture with a second selective solvent for aromatic hydrocarbons. The hydrocarbon feed is deasphalted by known batch separation, multiple vessel separation or substantially continuous liquid-liquid countercurrent treating with a liquefied normally gaseous hydrocarbon solvent.

U.S. Pat. No. 3,775,293 discloses a process for separating a heavy hydrocarbon into asphaltic, resin and oil fractions and converting the resins and oils into additional light hydrocarbon products by catalytic reactions. The heavy hydrocarbon is treated in two solvent extraction zones to (1) deasphalt the charge stock by removing an asphaltic pitch and (2) deresin the remainder by removing a resin concentrate and produce a deresined, deasphalted oil. The resin concentrate is introduced into a first fixed bed catalytic reaction zone to convert at least a portion of the concentrate into light hydrocarbon products and remove organometallic compounds. At least a portion of the first catalytic reaction zone product effluent is subjected to thermal cracking after which the heavy resins are separated as a by-product and the remainder is combined with the deresined, deasphalted oil. This mixture then is subjected to hydrocracking in a second fixed bed catalytic reaction zone to produce additional light hydrocarbon products having a reduced metals content.

U.S. Pat. No. 3,972,807 discloses a process for diminishing carry-over of metals-containing asphaltic material in a deasphalted oil. A feed stock is introduced into an extraction zone wherein it contacts a selective solvent and separates into a solvent-rich hydrocarbon phase and a solvent-lean hydrocarbon phase. The solvent is introduced into a lower portion of the extraction zone below the locus through which the feed is introduced and above a locus through which an asphaltic phase is to be removed. A portion of the solvent-rich phase is withdrawn from the extraction zone through a locus above the locus of feed introduction. The withdrawn stream then is heated to cause an asphaltic phase to separate from the remainder of the stream. The elevated temperature and pressure stream is introduced into an external asphalt settling zone to effect the separation and provide a settled asphalt phase and a substantially asphalt-free solvent and hydrocarbon phase. The externally precipitated asphalt phase then is reintroduced into the extraction zone through a locus just above that through which the solvent is introduced. The substantially asphalt-free solvent and hydrocarbon phase is reintroduced into the extraction zone through a locus intermediate a locus through which a deasphalted oil product is to be withdrawn and the locus through which the stream was initially removed at a lower temperature. The substantially asphalt-free hydrocarbon phase then is withdrawn as a deasphalted oil product.

It would be desirable to provide a simple method of separating a heavy hydrocarbon into asphaltic, resin and oil fractions while achieving a deep oils cut and also reducing the metals content of the oils caused by the presence of resinous material present therewith.

SUMMARY OF THE INVENTION

The discovery now has been made that it is possible to treat a heavy hydrocarbon material by the process hereinafter described to effect a deep oil cut in the heavy hydrocarbon while also reducing the metals content of the oils product.

The process comprises contacting the heavy hydrocarbon material with a solvent in a mixing zone to provide a mixture for introduction into a first separation zone. The first separation zone is maintained at an elevated temperature and pressure to effect a separation of the mixture into a fluid-like first light phase comprising solvent, oils, resins and some entrained asphaltenes and some organometallic compounds and a fluid-like first heavy phase comprising asphaltenes containing the bulk of the organometallic compounds and some solvent. The first light phase is withdrawn from the first separation zone and introduced into a second separation zone.

The second separation zone is maintained at a temperature level higher than the temperature level in the first separation zone and at an elevated pressure, which can be the same pressure as that maintained in the first separation zone, to effect a separation of the first light phase into a fluid-like second light phase comprising oils and solvent which collects in an upper portion of the second separation zone and a fluid-like second heavy phase comprising resins, organometallic compounds and some solvent.

The second heavy phase is withdrawn from the second separation zone and at least a portion thereof is recycled for introduction into the upper portion of the second separation zone. The recycled second heavy phase is introduced into the upper portion of the second separation zone to contact the second light phase to remove at least a portion of any resinous bodies, asphaltenes and organometallic compounds associated therewith that may be entrained in said second light phase.

The second light phase then is withdrawn and introduced into a third separation zone maintained at an elevated temperature and pressure to effect a separation of the second light phase into a third light phase comprising solvent and a third heavy phase comprising oils. Thereafter, the third heavy phase is withdrawn from the third separation zone and recovered.

In an alternate embodiment of the invention, the portion of the second heavy phase that is introduced into the upper portion of the second separation zone is heated to a temperature level sufficient to cause the formation of internal reflux within the upper portion of the second separation zone upon contact with the second light phase. The heated second heavy phase then is introduced into the upper portion of the second separation zone to contact the second light phase and remove resinous bodies asphaltenes and associated organometallic compounds that may be entrained therein by a combination of internal reflux and countercurrent settling of the second heavy phase through the rising second light phase.

DESCRIPTION OF THE PREFERRED EMBODIMENT

Figure 1:
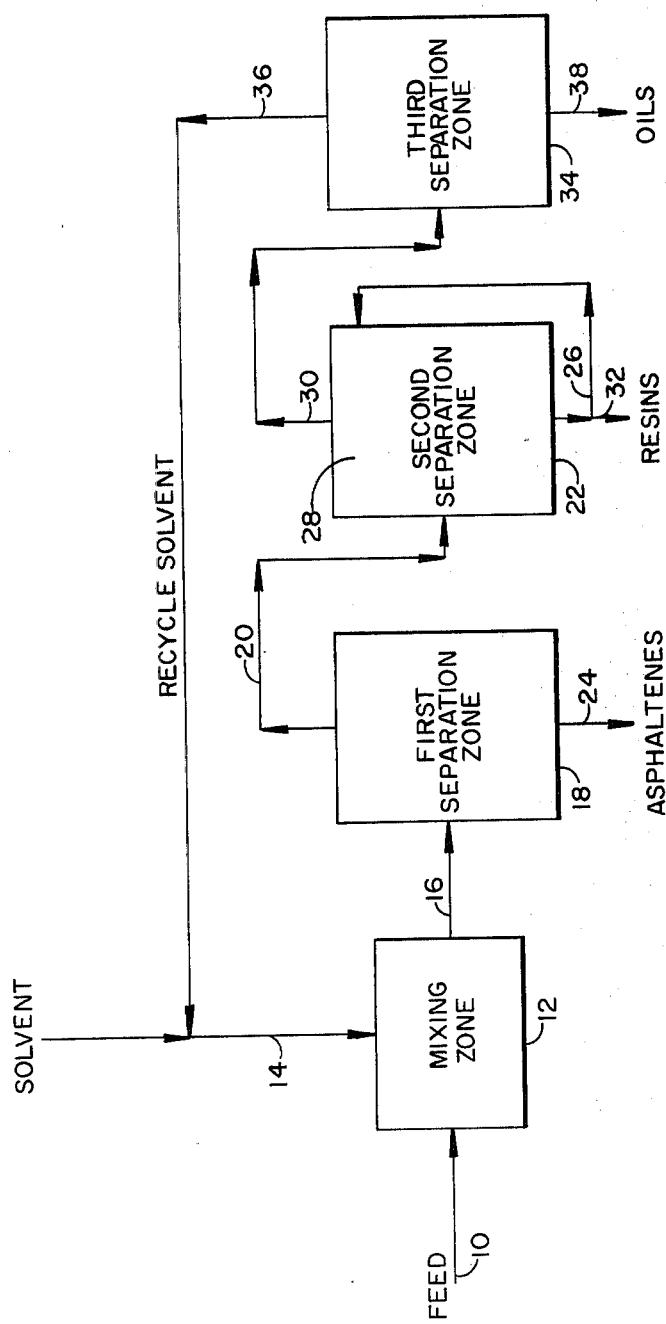
FIG. 1 is a diagramatic illustration of the process of this invention.

Turning now to FIG. 1, the process of the present invention is illustrated. A feed stock comprising a heavy hydrocarbon material is introduced into a mixing zone 12 through a conduit 10. A solvent is introduced into mixing zone 12 through a conduit 14 to contact and admix with the feed to provide a mixture. Sufficient solvent is introduced into mixing zone 12 to provide a ratio by volume of solvent to feed in the mixture in the range of from about 2:1 to about 20:1 and preferably in the range of from about 8:1 to about 12:1. It is to be understood that larger quantities of solvent may be used, but such use is unnecessary.

The mixture then is passed into a first separation zone 18 via a conduit 16. The first separation zone 18 is maintained at an elevated temperature and pressure to effect a separation of the mixture into a fluid-like first light phase comprising solvent, oils, resins and some organometallic compounds and a fluid-like first heavy phase comprising asphaltenes, organometallic compounds and some solvent. As previously indicated, a substantial portion of the organometallic compounds present in the heavy hydrocarbon material are associated with the asphaltenes. These compounds are separated from the heavy hydrocarbon material along with the asphaltenes as the first heavy phase. The organometallic compounds present in the fluid-like first light phase comprise lighter compounds associated with the resins and oils and some entrained asphaltenes and associated organometallics.

More particularly, the first separation zone 18 is maintained at a temperature level in the range of from about 150 degrees F. to above the critical temperature of the solvent and a pressure level at least equal to the vapor pressure of the solvent when at a temperature below the critical temperature of the solvent and at least equal to the critical pressure of the solvent when at a temperature equal to or above the critical temperature of the solvent. Preferably, the temperature level is maintained within a range of from about the critical temperature of the solvent to about 50 degrees F. above the critical temperature of the solvent. Preferably, the pressure level is maintained above the critical pressure of the solvent.

Alternatively, the heavy hydrocarbon material and solvent can be introduced directly into first separation zone 18 in the ratios previously described without prior admixing and then the mixture can be separated as previously described.

The first heavy phase is withdrawn from first separation zone 18 through a conduit 24 and recovered. The separated first light phase is passed from first separation zone 18 through a conduit 20 and introduced into a second separation zone 22. The second separation zone 22 is maintained at a temperature level higher than the temperature level in the first separation zone 18 and at an elevated pressure to effect a separation of the first light phase into a fluid-like second light phase comprising oils and solvent and a fluid-like second heavy phase comprising resins and some solvent. The second light phase which separates within second separation zone 22 collects in an upper portion 28 of second separation zone 22.

The second separation zone 22 is maintained at a temperature level above that in the first separation zone. The pressure level of second separation zone 22 is maintained at least equal to the vapor pressure of the solvent when zone 22 is maintained at a temperature below the critical temperature of the solvent and at least equal to the critical pressure of the solvent when maintained at a temperature equal to or above the critical temperature of the solvent. Preferably, the temperature level is maintained in a range of from about 5 degrees F. to about 100 degrees F. above the temperature in first separation zone 18 and most preferably at a temperature of from about 5 degrees F. to about 50 degrees F. above the critical temperature of the solvent. The pressure level in second separation zone 22 can be substantially the same pressure level as is maintained in first separation zone 18.

The deep oils cut separated by the above process from the feed of heavy hydrocarbon material normally contains some entrained resinous bodies, asphaltenes and organometallic compounds. The inventor has discovered that the treatment hereafter described provides an effective and economical removal of the entrained resinous bodies, asphaltenes and organometallic compounds from the oils.

The second heavy phase is withdrawn from the second separation zone 18 through a conduit 32 for recovery. At least a portion of the second heavy phase is withdrawn from conduit 32 through a conduit 26 and is recycled for introduction into upper portion 28 of second separation zone 22 via conduit 26. The recycled second heavy phase contacts the second light phase and thereafter settles through the second light phase to remove at least a portion of any resinous bodies or asphaltenes and associated organometallic compounds which may have been entrained within the second light phase.

In one preferred embodiment, the recycled second heavy phase is introduced into the upper portion 28 of second separation zone 22 through a nozzle (not shown) or other suitable device which disperses the second heavy phase as substantially uniform droplets. The droplets are of sufficient size to facilitate their settling through the rising second light phase comprising oils and solvent.

Preferably, the second heavy phase is introduced in an amount sufficient to provide a volume of second heavy phase of from about 10 percent of the volume of resins in the feed to about the volume of all of the material separated as the second heavy phase. If lesser quantities of the second heavy phase are used, lesser quantities of the resinous bodies present in the second light phase will be removed from said second light phase. Larger quantities of the second heavy phase also can be used.

In another embodiment, the second separation zone 22 contains a packing material comprising, for example, Pall rings, Raschig rings or the like which are well known by individuals of ordinary skill in the art to facilitate separations.

While the mechanism is not understood, it is believed that the introduction of the second heavy phase into the upper portion 28 of the second separation zone 22 to contact the second light phase effects the removal of the resinous bodies, asphaltenes and associated organometallic compounds contained therein by either or both liquid-liquid adsorption and mechanical scrubbing.

The second light phase is withdrawn from second separation zone 22 through a conduit 30 and introduced into a third separation zone 34. The third separation zone 34 is maintained at an elevated temperature and pressure to effect a separation of the second light phase into a third light phase comprising solvent and a third heavy phase comprising oils and some solvent. The temperature level in the third separation zone 34 is maintained at a level higher than the temperature level within second separation zone 22. The pressure level of third separation zone 34 is maintained at least equal to the vapor pressure of the solvent when zone 34 is maintained at a temperature below the critical temperature of the solvent and at least equal to the critical pressure of the solvent when maintained at a temperature equal to or above the critical temperature of the solvent. More particularly, the temperature level in third separation zone 34 preferably is maintained above the critical temperature of the solvent and most preferably at least about 50 degrees F. above the critical temperature of the solvent.

The separated third light phase is passed from the third separation zone 34 through a conduit 36 for recycle in the process.

The third heavy phase is withdrawn from third separation zone 34 through a conduit 38 and recovered.

The first, second and third heavy phases withdrawn through conduits 24, 32 and 38 respectively may be introduced into individual stripping sections (not shown) to strip any solvent that may be contained in said phases. Preferably the stripping sections would comprise steam strippers. The recovered solvent then can be recycled in the process.

In an alternate embodiment of the present invention, third separation zone 34 can comprise a flash zone in which the second light phase is flashed to a sufficiently reduced pressure to form at least one stream comprising deasphalted oil having a reduced metals content and one other stream comprising solvent. The deasphalted oil stream then is recovered as a product and the solvent stream can be recycled in the process of the present invention.

Figure 2:
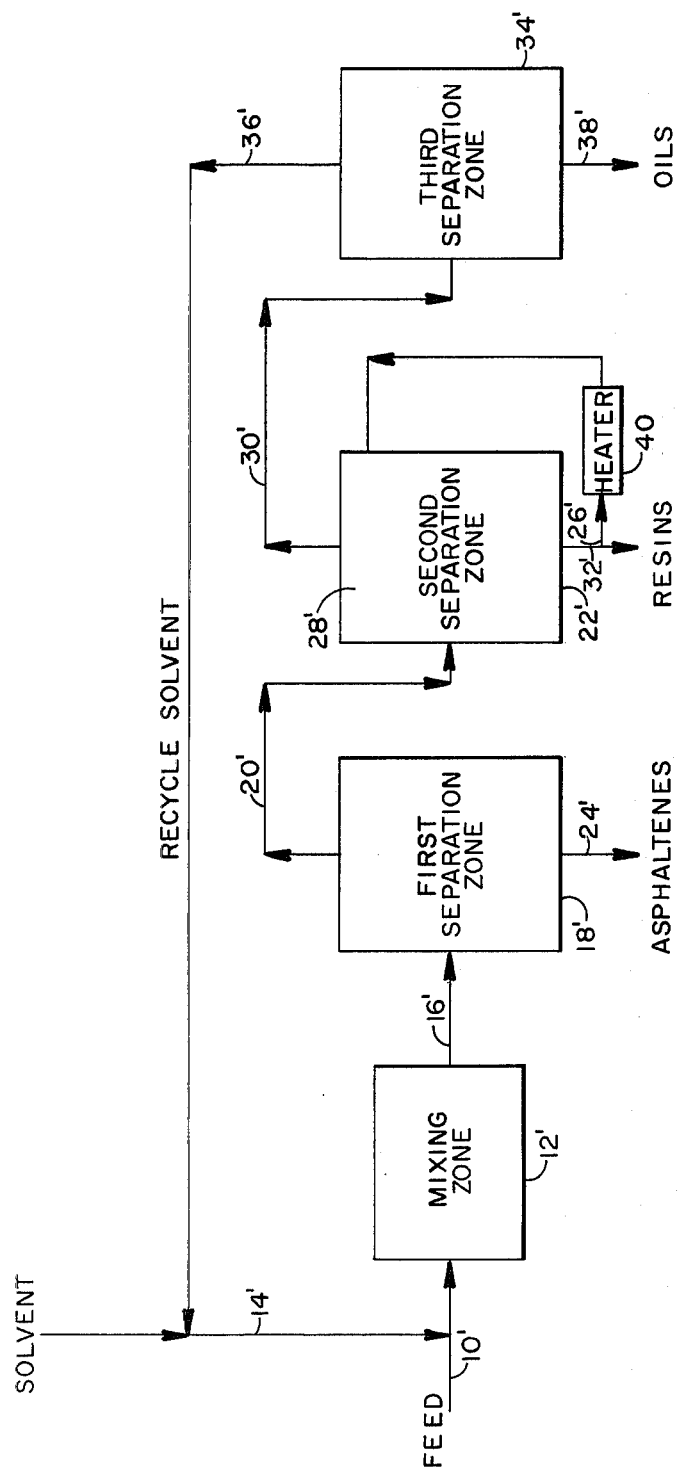
FIG. 2 is a diagramatic illustration of the process of this invention depicting heating of the recycled second heavy phase prior to introduction into the upper portion of the second separation zone.

Turning now to FIG. 2 another alternate embodiment of the present invention is illustrated. In this embodiment, the feed stock is introduced into mixing zone 12' through a conduit 10'. Solvent is introduced into mixing zone 12' through a conduit 14' to contact and admix with the feed to provide a mixture. The mixture then is passed from mixing zone 12' through a conduit 16' and introduced into a first separation zone 18'. The first separation zone 18' is maintained at an elevated temperature and pressure as previously described hereinabove to effect a separation of the mixture into a first light phase and a first heavy phase.

The first heavy phase is withdrawn from first separation zone 18' through a conduit 24' and recovered.

The first light phase is passed from first separation zone 18' through a conduit 20' and introduced into a second separation zone 22'. The second separation zone 22' is maintained at an elevated temperature and pressure as hereinbefore described to effect a separation of the first light phase into a second light phase which collects in an upper portion 28' of second separation zone 22' and a second heavy phase.

The second heavy phase is withdrawn from second separation zone 22' through a conduit 32' and at least a portion thereof is withdrawn from conduit 32' through a conduit 26' for introduction into the upper portion 28' of second separation zone 22'. The portion of second heavy phase is heated to a temperature level higher than the temperature level within upper portion 28' of second separation zone 22' prior to introduction thereinto by passage through a heater 40 interposed in conduit 26'. When the heated second heavy phase contacts the second light phase within the upper portion 28' of second separation zone 22' an internal reflux zone is formed as a result of the temperature difference between the fluids.

The internal reflux zone is formed within upper portion 28' of second separation zone 22' because of the behavioral characteristics of the solvent when maintained at a temperature and pressure above its critical temperature and pressure. When a fluid, such as the solvent, is maintained at conditions above its critical temperature and pressure conditions, it is referred to as a "supercritical fluid." If a supercritical fluid is heated at substantially constant pressure, marked reductions in the density of the fluid can occur. With regard to the present process, the reduction in density of the solvent is accompanied by a marked reduction in the solubility of the heavy hydrocarbon material dissolved in the solvent. The heavy hydrocarbon material, or at least a portion of the heavy hydrocarbon material, is at conditions below its critical temperature and pressure when the solvent is a supercritical fluid. These circumstances can cause a portion of the heavy hydrocarbon material and some of the solvent to separate from the remainder of the heavy hydrocarbon material and solvent. In particular, the heating of the recycled portion of the second heavy phase causes a change in the density of the solvent within upper portion 28' of second separation zone 22' upon contact therewith which causes at least a portion of the heavier hydrocarbon material (heavier resins and any asphaltenes present) in the second light phase to separate from the remainder as a separate heavy phase. Because of the difference in density between this newly separated heavy phase and the bulk of the hydrocarbon material in second separation zone 22' and particularly the second light phase comprising oils and solvent, the newly separated heavy phase settles along with the recycled portion of the second heavy phase through the lower density hydrocarbon material and solvent.

The second light phase contained within upper portion 28' of second separation zone 22' is scrubbed of at least a portion of any resinous bodies, asphaltenes and organometallic compounds that may be contained therein by the combination of the reflux action and the subsequent countercurrent settling of the second heavy phase in relation to the rising second light phase within second separation zone 22'.

The second light phase is withdrawn from the second separation zone 22' through a conduit 30' and introduced into a third separation zone 34'. The third separation zone 34' is maintained at an elevated temperature and pressure as hereinbefore described to effect a separation of the second light phase into a third light phase comprising solvent and a third heavy phase comprising oils and some solvent.

The third light phase is withdrawn from third separation zone 34' through a conduit 36' for recycle in the process.

The third heavy phase is withdrawn from the third separation zone 34' through a conduit 38' for recovery.

To further illustrate the process of this invention and not by way of limitation the following examples are provided.

EXAMPLE I

A reduced crude comprising 18 percent asphaltenes, 30 percent resins and 52 percent oils, by weight, having a softening point of about 110 degrees F. is admixed with hexane in a volume ratio of solvent to feed of 10:1 and introduced into a first separation zone. The first separation zone is maintained at a temperature of 470 degrees F. and a pressure of 550 psig. The feed mixture separates into a first light and a first heavy phase. The first light phase is withdrawn and introduced into a second separation zone maintained at a temperature of 475 degrees F. and a pressure of 545 psig. The first light phase separates into a second light phase and a second heavy phase.

A first portion of the second light phase is withdrawn from the second separation zone and is found to contain entrained resinous bodies, some asphaltenes and organometallic compounds that were not separated with the second heavy phase.

A portion of the second heavy phase comprising a volume of about 10 percent of the volume of the resins present in the feed then is withdrawn from the second separation zone and introduced into the upper portion of the second separation zone to contact the second light phase. The second heavy phase is permitted to settle through the rising second light phase. A second portion of the second light phase then is withdrawn from the second separation zone and is found to contain less entrained resinous bodies, asphaltenes and organometallic compounds than the first portion which is examined.

EXAMPLE II

The reduced crude of Example I is admixed with n-pentane in a volume ratio of solvent to feed of 10:1 and introduced into a first separation zone maintained at a temperature of 425 degrees F. and a pressure of 650 psig. The feed mixture separates into a first light phase and a first heavy phase. The first light phase is withdrawn and introduced into a second separation zone maintained at a temperature of 430 degrees F. and a pressure of 645 psig. The first light phase separates into a second light phase and a second heavy phase.

A first portion of the second light phase is withdrawn from the second separation zone and is found to contain etrained resinous bodies, some asphaltenes and organometallic compounds that were not separated with the second heavy phase.

A portion of the second heavy phase comprising a volume of about 10 percent of the volume of the resins present in the feed then is withdrawn from the second separation zone and introduced into the upper portion of the second separation zone to contact the second light phase. The second heavy phase is permitted to settle through the rising second light phase. A second portion of the second light phase is withdrawn from the second separation zone and is found to contain less entrained resinous bodies, asphaltenes and organometallic compounds that the first portion which is examined.

EXAMPLE III

A light Arabian vacuum residuum is admixed with n-butane in a volume ratio of solvent to feed of 12:1 and introduced into a first separation zone maintained at a temperature of 250 degrees F. and a pressure of 650 psig. The feed mixture separates into a first light phase and a first heavy phase. The first light phase is withdrawn and introduced into a second separation zone maintained at 275 degrees F. and 645 psig. The first light phase separates into a second light phase and a second heavy phase.

A first portion of the second light phase is withdrawn from the second separation zone and is found to contain entrained resinous bodies, some asphaltenes and organometallic compounds that were not separated with the second heavy phase.

A portion of the second heavy phase comprising a volume of about 30 percent of the volume of the resins present in the feed is withdrawn from the second separation zone and introduced into the upper portion of the second separation zone to contact the second light phase. The second heavy phase is permitted to settle through the rising second light phase. A second portion of the second light phase is withdrawn from the second separation zone and is found to contain less entrained resinous bodies, asphaltenes and organometallic compounds than the first portion which is examined.

EXAMPLE IV

The reduced crude of Example I is admixed with n-pentane in a volume ratio of solvent to feed of 10:1 and introduced into a first separation zone maintained at a temperature of 425 degrees F. and a pressure of 650 psig. The feed mixture separates into a first light phase and a first heavy phase. The first light phase is withdrawn and introduced into a second separation zone maintained at a temperature of 430 degrees F. and a pressure of 645 psig. The first light phase separates into a second light phase and a second heavy phase.

A first portion of the second light phase is withdrawn from the second separation zone and is found to contain entrained resinous bodies, some asphaltenes and organometallic compounds that were not separated with the second heavy phase.

A portion of the second heavy phase comprising a volume of about 15 percent of the volume of the resins present in the feed then is withdrawn from the second separation zone, heated to a temperature of about 480 degrees F. and introduced into the upper portion of the second separation zone to contact the second light phase. When the heated second heavy phase contacts the second light phase within the upper portion of the second separation zone an internal reflux zone is formed because the second heavy phase then is permitted to settle through the rising second light phase. A second portion of the second light phase is withdrawn from the second separation zone and is found to contain less entrained resinous bodies, asphaltenes and organometallic compounds than the first portion which is examined.

The foregoing examples illustrate the means by which the present invention can be used to reduce the quantity of organometallic compounds contained in oils separated from heavy hydrocarbon materials.

The term "heavy hydrocarbon material" means pyrogenous bitumens, native bitumens or one or more fractions or components thereof. The pyrogenous bitumens include heavy or very low API gravity petroleum crudes, reduced crudes, either steam or vacuum refined, hard and soft wood pitches, coal tar residues, cracked tars, tall oil and the like. The native bitumens include gilsonite, wurtzilite, albertite and native asphalt, for instance, Trinidad asphalt and the like.

The term "solvent" means a fluid comprising at least one member selected from the group consisting of: aromatic hydrocarbons having normal boiling points below 310 degrees F., such as benzene, toluene, o-, m- and p-xylene and isopropyl benzene; paraffin hydrocarbons containing from 4 through 9 carbon atoms, such as pentane, hexane, heptane, octane and nonane; and mono-olefin hydrocarbons containing from 4 to 8 carbon atoms, such as butene, pentene, hexene, heptene and octene and any other solvent known to those skilled in the art as capable of producing a deeper oil cut in a heavy hydrocarbon material than that which can be obtained with a light, normally gaseous hydrocarbon solvent such as propane.

While the invention has been described with respect to what at present are preferred embodiments thereof, it will be understood, of course, that certain changes, substitutions, modifications and the like may be made therein without departing from its true scope as defined in the appended claims.

What is claimed is:

1. A process for producing a low metals content deasphalted oil from a heavy hydrocarbon material comprising:
    introducing a heavy hydrocarbon material comprising oils, resins, asphaltenes and associated organometallic compounds and a solvent into a first separation zone maintained at a temperature at least equal to the critical temperature of said solvent and a pressure at least equal to the critical pressure of said solvent to effect a separation of said heavy hydrocarbon material and solvent into a first light phase comprising oils, resins, some of the organometallic compounds and solvent and a first heavy phase comprising asphaltenes, organometallic compounds and some solvent;
    introducing said first light phase into a second separation zone maintained at a temperature level higher than the temperature in said first separation zone and at an elevated pressure to effect a separation of said first light phase into a second light phase comprising oils, entrained resins and organometallic compounds and solvent which collects in an upper portion of said second separation zone and a second heavy phase comprising resins and some solvent;
    withdrawing at least a portion of said second heavy phase from said second separation zone;
    recycling at least a portion of said withdrawn second heavy phase into said upper portion of said second separation zone to contact said second light phase and settle through said second light phase to remove at least a portion of the entrained resins and organometallic compounds; and
    recovering said second light phase comprising solvent and deasphalted oil having a reduced metals content after contact with said recycled second heavy phase.

2. The process of claim 1 defined further to include the step of:
    heating said portion of said recycled second heavy phase to a temperature level higher than the average temperature level within the second separation zone prior to introducing said recycled portion into said upper portion of said second separation zone.

3. The process of claim 1 defined further to include the step of:
    heating said portion of said recycled second heavy phase prior to introducing said recycled portion into said upper portion of said second separation zone to a temperature level sufficient to cause the formation of an internal reflux zone within said upper portion of said second separation zone upon introduction therein to scrub at least a portion of the entrained resins and organometallic compounds from said second light phase.

4. The process of claim 1 wherein providing said solvent is defined as:
    providing a solvent comprising at least one member selected from the group consisting of aromatic hydrocarbons having normal boiling points below 310 degrees F., paraffin hydrocarbons containing from 4 through 9 carbon atoms and mono-olefin hydrocarbons containing from 4 through 8 carbon atoms.

5. The process of claim 1 wherein said recycling of said second heavy phase into said upper portion of said second separation zone is defined further as:
    recycling said second heavy phase in an amount by volume of from about 10 percent of the volume of resins contained in said heavy hydrocarbon material to an amount equal to about all of the separated second heavy phase.

6. The process of claim 1 wherein the second separation zone is maintained at a temperature level above the first temperature level defined further as:
    maintaining said second separation zone at a temperature level in the range of from about 5 degrees F. to about 100 degrees F. higher than the temperature level in the first separation zone.

7. The process of claim 1 defined further to include the steps of:
  introducing said second light phase after contact with said recycled second heavy phase into a third separation zone maintained at an elevated temperature and pressure to effect a separation of said second light phase into a third light phase comprising solvent and third heavy phase comprising deasphalted oils having a reduced metals content; and
  recovering said deasphalted oils as a product.

8. The process of claim 7 wherein the third separation zone is maintained at an elevated temperature defined further as:
  maintaining said third separation zone at a temperature level higher than the temperature level in the second separation zone.

9. The process of claim 1 wherein the second separation zone is maintained at a temperature level in the range of from about 5 degrees F. to about 50 degrees F. above the critical temperature of the solvent.

10. The process of claim 1 defined further to include the steps of:
  flashing said second light phase after contact with said recycled second heavy phase to form at least one stream comprising solvent and one other stream comprising deasphalted oils having a reduced metals content; and
  recovering said deasphalted oils stream.

11. A process for producing a low metals content deasphalted oil from a heavy hydrocarbon material comprising:
  introducing a heavy hydrocarbon material comprising oils, resins, asphaltenes and associated organometallic compounds and a solvent into a first separation zone maintained at a temperature at least equal to the critical temperature of said solvent and a pressure at least equal to the critical pressure of said solvent to effect a separation of said heavy hydrocarbon material and solvent into a first light phase comprising oils, resins, some of the organometallic compounds and solvent and a first heavy phase comprising asphaltenes, organometallic compounds and some solvent;
  introducing said first light phase into a second separation zone maintained at a temperature level higher than the temperature in said first separation zone and at an elevated pressure to effect a separation of said first light phase into a second light phase comprising oils, entrained resins and organometallic compounds and solvent which collects in an upper portion of said second separation zone and a second heavy phase comprising resins and some solvent;
  withdrawing at least a portion of said second heavy phase from said second separation zone;
  recycling at least a portion of said withdrawn second heavy phase into said upper portion of said second separation zone to contact said second light phase to remove at least a portion of the entrained resins and organometallic compounds;
  introducing said second light phase after contact with said recycled second heavy phase into a third separation zone maintained at a temperature level above the temperature level in said second separation zone and at an elevated pressure to effect a separation of said second light phase into a third light phase comprising solvent and a third heavy phase comprising deasphalted oils having a reduced metals content; and
  recovering said deasphalted oils as a product.

12. The process of claim 11 defined further to include the step of:
  heating said portion of said recycled second heavy phase to a temperature level higher than the average temperature level within the second separation zone prior to introducing said recycled portion into said upper portion of said second separation zone.

13. The process of claim 11 defined further to include the step of:
  heating said portion of said recycled second heavy phase prior to introducing said recycled portion into said upper portion of said second separation zone to a temperature level sufficient to cause the formation of an internal reflux zone within said upper portion of said second separation zone upon introduction therein to scrub at least a portion of the entrained resins and organometallic compounds from said second light phase.

14. The process of claim 11 wherein providing said solvent is defined as:
  providing a solvent comprising at least one member selected from the group consisting of aromatic hydrocarbons having normal boiling points below 310 degrees F., paraffin hyrocarbons containing from 4 through 9 carbon atoms and mono-olefin hydrocarbons containing from 4 through 8 carbon atoms.

* * * * *